United States Patent [19]

Poshkus

[11] 4,317,626

[45] Mar. 2, 1982

[54] PHOTO-IDENTIFICATION CARD PACK

[75] Inventor: Gerald M. Poshkus, Rochester, N.Y.

[73] Assignee: Eastman Kodak Company, Rochester, N.Y.

[21] Appl. No.: 93,343

[22] Filed: Nov. 13, 1979

Related U.S. Application Data

[62] Division of Ser. No. 5,406, Jan. 22, 1979, Pat. No. 4,245,035.

[51] Int. Cl.[3] .......... G03C 1/40; G03B 19/10; G03D 9/00; G03C 1/48

[52] U.S. Cl. .......... 354/180; 354/174; 354/176; 354/303; 354/337; 40/2.2; 430/207; 430/496; 430/499

[58] Field of Search .......... 354/105, 107, 108, 174, 354/180, 303, 337, 176; 430/207, 496, 499; 40/2.2

[56] References Cited

U.S. PATENT DOCUMENTS

| | | | |
|---|---|---|---|
| 2,951,304 | 9/1960 | Herte | 40/158 |
| 2,982,650 | 5/1961 | Land | 430/207 |
| 3,069,266 | 12/1968 | Land | 430/207 |
| 3,221,942 | 12/1965 | Glass | 430/208 |
| 3,249,033 | 5/1966 | Cobb | 430/496 |
| 3,342,600 | 9/1967 | Downey | 430/208 |
| 3,352,674 | 11/1967 | Harvey | 430/208 |
| 3,498,788 | 3/1970 | Haas | 430/10 |
| 3,541,938 | 11/1970 | Harvey | 430/496 |
| 3,614,839 | 10/1971 | Thomas | 40/2.2 |
| 3,652,282 | 3/1972 | Land | 430/207 |
| 3,672,272 | 6/1972 | Cole | 430/209 |
| 3,672,273 | 6/1972 | Nerwin | 430/209 |
| 3,674,622 | 7/1972 | Plaase | 161/160 |
| 3,696,716 | 10/1972 | Pasieka | 354/5 |
| 3,893,854 | 7/1975 | Honjo et al. | 430/496 |

FOREIGN PATENT DOCUMENTS 21692 of 1908 United Kingdom .

*Primary Examiner*—Richard L. Schilling
*Attorney, Agent, or Firm*—J. B. Turner

[57] ABSTRACT

A pack of photo-identification cards comprises a casing including an exposure aperture and an exit slot and containing a plurality of photo-identification cards. Each card includes an exposable film chip surrounded by a core spacer and laminated with a transparent cover panel to substantially entirely surround the film chip except for access and venting ports through which processing fluid can be introduced to the film chip and air can be displaced from the volume occupied by the fluid.

2 Claims, 10 Drawing Figures

PHOTO-IDENTIFICATION CARD PACK

This is a division of application Ser. No. 005,406, filed Jan. 22, 1979 now U.S. Pat. No. 4,245,035.

BACKGROUND OF THE INVENTION

1. Field of the Invention

The present invention relates to a pack of photo-identification cards, and more specifically to such a pack including a casing and a plurality of laminated cards, each card comprising an exposable film chip encased in the plastic laminate such that a processing fluid can be introduced to the film chip through the laminate.

2. Brief Description of the Prior Art

Identification cards have become very popular in recent years. Retail outlets use them for charging merchandise, governmental agencies for licenses, and businesses for entrance passes. Extensive use is not surprising when the many advantages of the cards are considered. They are thin, substantially flat, and relatively stiff, making them easy to handle and carry. They typically support information identifying the bearer, the issuer and the subject matter to which the card pertains, in a format that discourages forgeries. In many cases the information is both visibly recognizable and machine readable. An embossed card with a magnetic stripe, for example, can be used to withdraw cash from a particular bank account through an unattended dispensing machine, or to print information onto a charge slip under a pressure plate.

Although identification cards take a number of popular forms, there are two of particular interest in connection with the present invention. The first comprises a laminate, typically three layers, of an embossable polymeric material, such as a rigid vinyl. Polyvinyl chloride, or a copolymer of polyvinyl chloride and polyvinyl acetate, are typical examples. The central layers of the laminate are opaque and carry visible information, while the outer layers are transparent, may be embossed, may support a magnetic stripe, and provide security against tampering with the information carried by the central layers. Such a card can be made essentially tamperproof by fusing the respective layers together under suitable heat and pressure to melt the respective plastic layers together. Ultrasonic or dielectric sealers frequently are used to create a weld that cannot be broken without destroying the card. There are disadvantages to such cards, however. Ultrasonic and dielelectric sealing generally require sophisticated equipment that cannot be provided easily to the numerous locations desirable for interfacing with the intended issuers of the cards. This, in turn makes it difficult to employ photographs with the cards.

The other type, frequently referred to as a photo-identification card, includes a picture of the intended bearer encased in a plastic laminate along with other information. In this case, the cards are usually supplied in pieces which are assembled on location, after the photograph is taken, and laminated with transparent plastic panels to discourage tampering. In the more convenient products, the photograph is of the instant-processing type, so there is minimal delay between taking the photograph and delivering the finished card to the user. Such cards have the advantage of the photograph, but many are not as secure against forgeries compared to the first-mentioned type of card. This disadvantage results most probably from the requirement of assembly on location, where controls are subject to variance, and the equipment is not sufficiently sophisticated to provide plastic-to-plastic bonding between the respective layers.

These and other problems that are alleviated by the present invention will become more apparent from an examination of the prior art in connection with the following description.

SUMMARY OF THE INVENTION

In accordance with the present invention, a pack of photo-identification cards is provided which comprises a casing including an exposure aperture and an exit slot and containing a plurality of photo-identification cards. Each card includes a photographically-exposable piece of sheet film, sometimes called a chip, encased in a permanent laminate, such that exposure, processing and viewing of the chip can be accomplished without removing it from the tamperproof environment of the laminate. More specifically, in accordance with a preferred embodiment, the exposable film chip is carried in a compartment in a plastic core, which is covered by one or more transparent plastic panels. An access port delivers processing fluid from the exterior of the card to the compartment, to develop the film chip, while a venting port releases the air from the space filled by the fluid. The film is of the self-processing, self-timing type, which requires only a single development fluid, and provides a final color picture in under ten minutes with relatively unsophisticated supporting equipment.

Still other aspects of the invention and more specific features will become apparent to those skilled in the art from the following description with reference to the accompanying drawings.

DESCRIPTION OF THE DRAWINGS

In the detailed description of the preferred and alternate embodiments of the invention presented below, reference is made to the accompanying drawings, in which.

Figure 8:
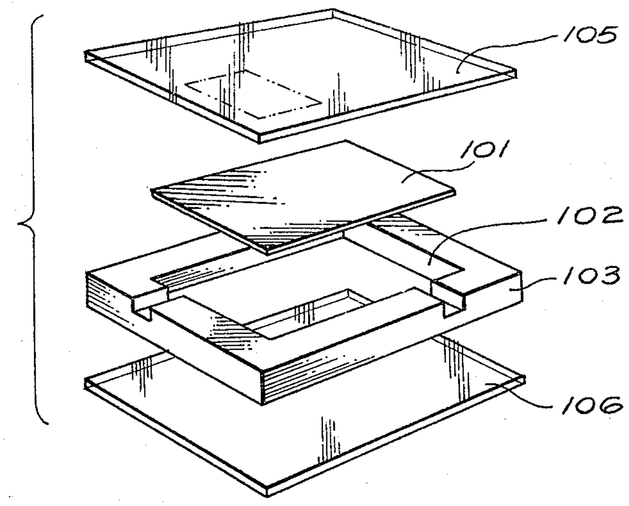
FIG. 8 is an exploded perspective view of yet another photo-identification card, similar to the card of FIG. 1 and suitable for use in a pack in accordance with the present invention, but in which the film-chip compartment occupies a major portion of the laminate for recording written information as well as the image of the intended bearer of the card.
Figure 9:
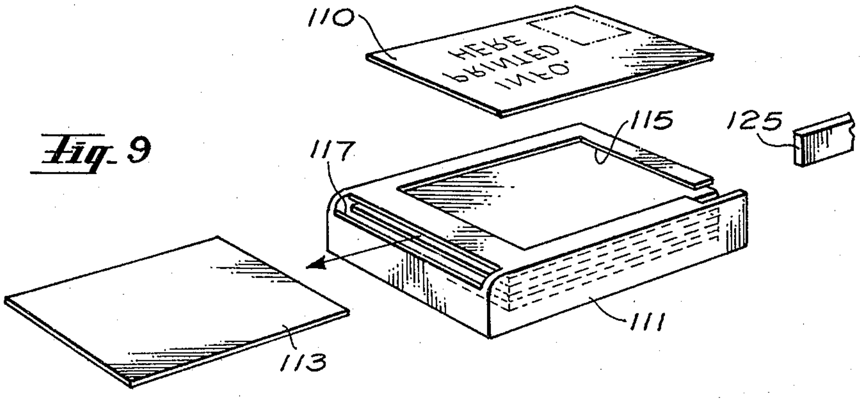

FIG. 9 is a schematic perspective illustration of a pack, in accordance with the present invention, for containing a plurality of the cards of FIG. 8, and including a covering template for exposing information, carried by the template, onto the film.

Figure 10:
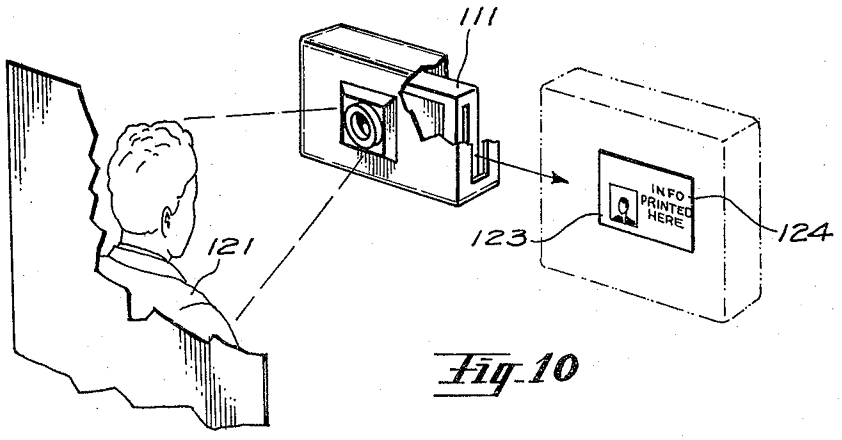

FIG. 10 is a schematic perspective illustration depicting exposure of the identification card of FIG. 8 in a pack with a template as depicted in FIG. 9.

DESCRIPTION OF PREFERRED AND ALTERNATIVE EMBODIMENTS

Figure 1:
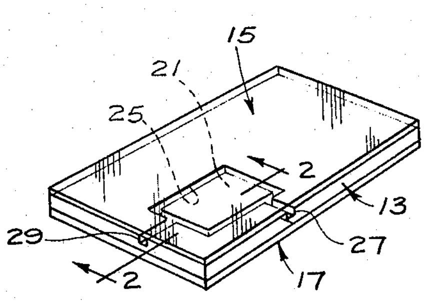
FIG. 1 is a perspective view of a photo-identification card, suitable for use in a pack in accordance with the present invention, including an unexposed film chip encased in a three-layer lamination having an access port for delivering processing fluid to the chip.
Figure 2:
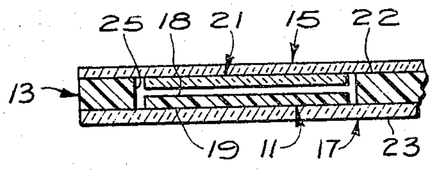
FIG. 2 is a cross-sectional view, taken along line 2—2 in FIG. 1, depicting the laminations and the compartment in which the film chip is received.
Figure 3:
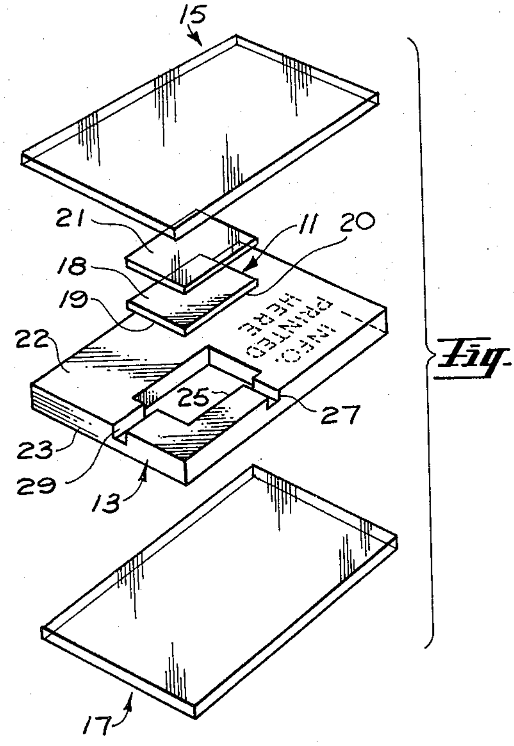
FIG. 3 is an exploded perspective view of the identification card of FIG. 1, illustrating the respective layers of the lamination including a core spacer and two cover panels over opposed faces of the core.

Referring first to FIGS. 1-3, there is depicted a photo-identification card including a film chip 11 (FIGS. 2 and 3), a core spacer 13 and first and second covering panels 15 and 17, respectively.

The film chip 11 comprises a piece of photographic sheet film having first and second opposed parallel faces, 18 and 19 (FIG. 3), and an edge-perimeter 20. The chemistry of the chip is not described in detail here, since it can be selected from a number of alternatives outlined, for example, in *Research Disclosure* No. 15,162, Volume 151, published in November of 1976. Briefly, however, the chip is a fluid-permeable structure including a plurality of photosensitive layers for recording a developable latent image and a mordant layer for receiving a dye image in accordance with development of the latent image. When an appropriate high-pH fluid composition is distributed over the structure, it permeates the respective layers, develops the latent image and releases an image-wise distribution of the dyes which migrate to the mordant layer. At the same time, the fluid hydrolizes appropriate timing layers to reduce the pH at a controlled rate, stopping the reaction. In this card, the film chip is adapted to be exposed from one face, 18, and viewed from the opposite face 19. In other cards, exposure and viewing are from the same direction. This card also locates the timing and neutralizing layers on a separate supporting piece 21, superposed over the photosensitive layers, but it should be noted that other arrangements of the respective layers, not employing such a separate piece, may be desirable under certain circumstances.

The core spacer 13 comprises an opaque, relatively stiff, plate which includes opposed, parallel surfaces 22 and 23 suitable for receiving printed information. The core is somewhat thicker than the film chip, and defines a shallow compartment 25, open through both faces of the core, for receiving the chip. The compartment is configured to surround substantially the entire edge perimeter of the chip in close proximity thereto, while accommodating the timing-layer piece and a quantity of the developing fluid over at least one face of the film chip without exceeding the thickness of the core.

Fluid delivery means in the form of an access port 27, is provided for introducing the developing fluid from the exterior of the identification card to the interior of the film-chip compartment. Similarly, a venting port 29, opposite the access port, releases air displaced by the fluid. As depicted in FIGS. 1-3, the ports are arranged to deliver the fluid to the exposure face 18, and the thickness of the core, relative to the chip, is sufficient to receive a quantity of the fluid in a layer adequate to develop the latent image and diffuse the dyes as outlined above.

Cover panels 15 and 17 are thin, transparent sheets flexible enough to conform to the core spacer, yet tough enough to protect the card from abuse. The panels are permanently laminated to opposite faces of the core spacer, and cover at least the compartment 25, encasing the film chip physically therebetween while, at the same time, permitting exposure and viewing of the chip.

The core spacer and covering panels are formed of a tough plastic suitable for embossing, usually referred to as a polymeric material. Films known as rigid vinyls are particularly effective, including polyvinyl chloride, or a high chloride content copolymer of vinyl acetate and vinyl chloride. Semi-rigid vinyls are also suitable. These are similar to the rigid vinyls, but include suitable plasticizers.

The card is fully assembled and permanently laminated at the time of manufacture with the film chip captured inside. This is accomplished under appropriate conditions of heat and pressure to melt the plastic at the interfaces between core and panels, fusing or welding the card together with plastic-to-plastic bonds. A dielectric welder employing radio-frequency waves can be used, for example, to excite the molecular structure of the laminate, heating the respective layers to the melting point around substantially the entire periphery of the film chip or over substantially the entire laminate. Care is required not to melt the whole card or destroy the photosensitive properties of the film chip. Other sealing techniques may employ ultrasonic vibrators to melt only the interfaces between the respective layers.

The thickness of the respective layers should be controlled to provide a final desired thickness. With the film chip 11 secured to one of the cover panels 17, and the timing-layer support secured to the other cover panel 15, the final core thickness should provide a space above the photosensitive layer sufficient to accommodate the desired thickness of the fluid developing composition. At the same time, the overall dimensions of the card should conform to present commercial standards for such cards.

By way of a preferred example, the core spacer is twenty thousandths of an inch thick, the cover panels are each five thousandths thick, and the access and venting ports are seven thousandths square in cross-section. The film chip and timing materials are the same as presently available commercially in Kodak PR-10 Instant-Print Film, as is the processing liquid, except the liquid is lower in viscosity, much like water.

Thus assembled, the card is a durable laminate permanently encasing an unexposed, light-exposable film chip. The laminate surrounds substantially the entire chip, except for the access and venting ports, and cannot be delaminated without destroying the card, making attempted forgeries easily detectable.

Figure 4:
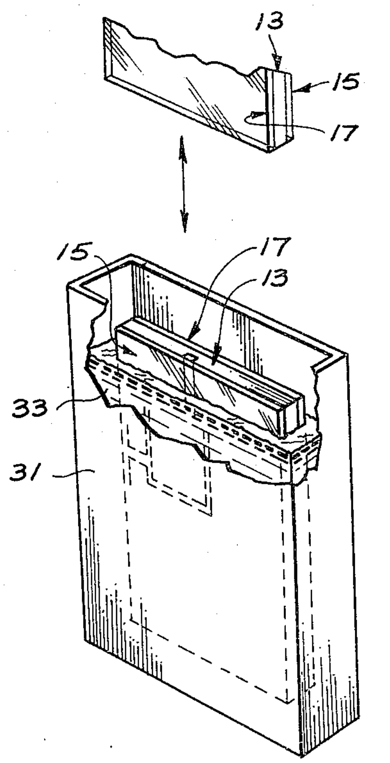
FIG. 4 is a schematic illustration of developing apparatus suitable for use with the identification card of FIG. 1.

The card is supplied in a light-tight package and loaded into a camera in a light protected environment. The film chip is then exposed to the intended subject and ejected, perhaps directly from the camera, into a reservoir 31 of the processing fluid 33, as shown in FIG. 4. The access port and the film compartment are submerged in the fluid while the venting port extends thereabove. The developing fluid then flows from the reservoir, through the access port, and fills the compartment, displacing any air through the venting port. Development proceeds automatically to completion, as described above, and the card is removed to view the final image. Thusly, the chip is exposed through the laminate, developed by a single solution and viewed through the laminate without ever having been removed from its protected environment.

In order to facilitate processing, the access and venting ports should be sufficiently large to deliver the fluid from the reservoir to the film compartment with only a slight differential in pressure therebetween. At the same time, however, once the compartment is filled, the respective ports should restrict draining of the fluid from the compartment so the card can be removed from the reservoir before processing is completed. Appropriate gelatin layers on the film chip 11 or piece 21 can be used to hold the fluid once it reaches the compartment. Should the card be left in the solution, and once the pressure equalizes, the ports should sufficiently isolate the compartment for the mechanism in the chip to neutralize the fluid in the compartment and end the development cycle.

Figure 5:
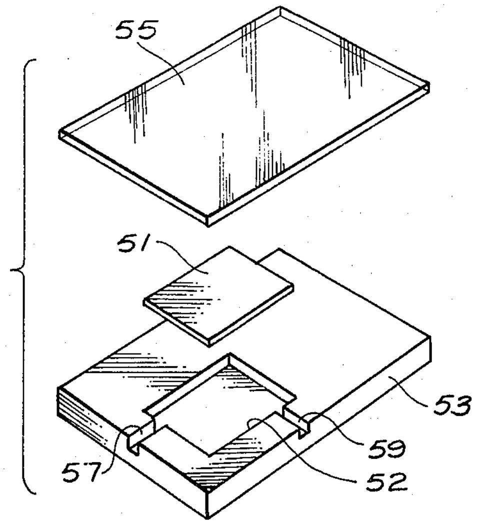
FIG. 5 is an exploded perspective view of an another photo-identification card, similar to the card of FIG. 1 and suitable for use in a pack in accordance with the present invention, but in which the film-chip compartment is open to only one surface of the core.
Figure 6:
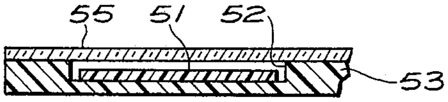
FIG. 6 is a cross-sectional view of the identification card of FIG. 5, depicting the compartment in which the film chip is received.
Figure 7:
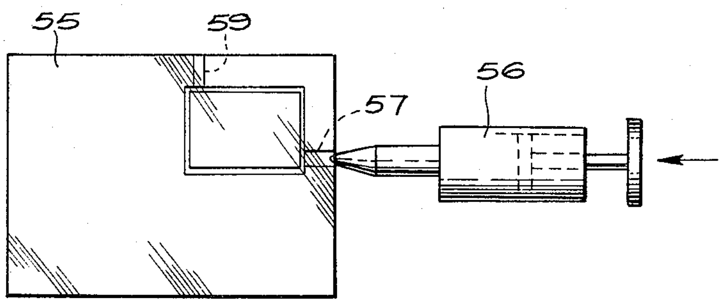
FIG. 7 is a schematic illustration of an alternative device for introducing a developing fluid to the film-chip compartment.

In FIGS. 5–7, another card is depicted, which is similar in many respects to the above-described card, but includes a film chip 51 that is exposed and viewed from the same side. In this case, the compartment 52 is open to only one face of the core 53, and only one transparent covering panel 55 is required. The portion of this panel that covers the chip is coated with transparent timing and neutralizing layers, eliminating the need for the separate piece 21 employed in the preferred embodiment. Such coatings do not extend over the areas where the laminate is sealed together, however, or at least they are such as not to weaken the plastic-to-plastic bonds between the respective layers.

Processing is accomplished, in a light protected environment, by injecting the single-solution developing fluid from a syringe 56 into the access port 57. Air is released through the venting port 59.

Still another card suitable for use in a pack in accordance with the invention is depicted in FIGS. 8–10. In this case the film chip 101 is much larger and is received in a compartment 102 that subtends a substantial portion of the card. The compartment is open to both faces of the core 103 and is covered by two transparent panels 105 and 106, as in the preferred embodiment. Such an enlarged chip is suitable for exposing written information onto the card as well as the image of the intended bearer. A split-image exposure device could be used, for example, to sequentially or simultaneously expose the information and the bearer's image onto the chip. Illustrated, however, is a template 110 adapted to be interposed between the subject and the chip for applying the information.

FIG. 9 depicts a film pack in accordance with the present invention. The film pack 111 includes a plurality of cards as described above and a dark slide 113, an exposure aperture 115 and an exit slot 117. The template 110 is aligned over the exposure aperture of the pack for photographically imprinting the information onto the cards in the pack.

As depicted in FIG. 10, the pack is loaded into a suitable camera that will expose the image of a subject 121 onto some portion 123 of the film chip while simultaneously exposing the written information from the template onto the same or some other portion 124 of the chip. The exposed card is then ejected from the camera by a picker 125 (FIG. 9) and immersed in the developing fluid for processing as described above in connection with the first-described card.

It should now be apparent from the above description that the structure of the present invention provides significant advantages not available from the teaching of the prior art.

The invention has been described in detail, but it will be understood that variations and modifications can be effected within the spirit and scope of the invention.

I claim:

1. A pack of instant, liquid-developable, photo-identification cards; said pack comprising:

a casing including an exposure aperture and an exit slot;

a plurality of photo-identification cards in said casing, each of said cards comprising:

a thin, plate of polymeric material and having opposed parallel faces, and an open section extending between said faces, at least one of said faces being adapted for carrying information, a piece of film in said open section, said film piece being photographically exposable to record a latent image developable by liquid to establish a visible image, first and second transparent, panels of polymeric material covering said faces of said plate, including the open section for protecting said film piece from alteration, said first and second panels being laminated to said plate by permanent polymeric material to polymeric material bonds, and port means for introducing developing liquid to said piece of film; and a template extending over the exposure aperture of said casing and carrying information sequentially exposable onto the pieces of film in the cards in said casing.

2. A pack of photo-identification cards comprising:

a casing including an exposure aperture and an exit slot; and a plurality of photo-identification cards in said casing, each of said cards comprising:

a laminate of polymeric material and including a shallow compartment surrounded substantially entirely by said laminate and an access port through which developing fluid can be introduced from the exterior of said laminate into said compartment; and a photographically exposable film chip disposed in said compartment and exposable through said laminate and said exposure aperture to record a latent image developable by developing fluid to establish an image viewable through said laminate.

* * * * *